United States Patent
Liao

(10) Patent No.: US 11,808,400 B2
(45) Date of Patent: Nov. 7, 2023

(54) COMPACT FIRST PERSON VIEW (FPV) PAN AND TILT CAMERA MOUNT

(71) Applicant: Robert Pofeng Liao, Taichung (TW)

(72) Inventor: Robert Pofeng Liao, Taichung (TW)

( * ) Notice: Subject to any disclaimer, the term of this patent is extended or adjusted under 35 U.S.C. 154(b) by 32 days.

(21) Appl. No.: 17/704,123

(22) Filed: Mar. 25, 2022

(65) Prior Publication Data

US 2023/0028734 A1 Jan. 26, 2023

(30) Foreign Application Priority Data

Jul. 20, 2021 (TW) ................. 110126587

(51) Int. Cl.
*F16M 11/12* (2006.01)
*G03B 17/56* (2021.01)

(52) U.S. Cl.
CPC ......... *F16M 11/126* (2013.01); *G03B 17/561* (2013.01); *G03B 2217/00* (2013.01)

(58) Field of Classification Search
CPC .... F16M 11/12; F16M 11/121; F16M 11/123; F16M 11/126; F16M 11/2035; F16M 11/2042; F16M 11/205; F16M 11/2064; F16M 11/22; F16M 13/02; F16M 13/022; G03B 17/561; G03B 2217/00
See application file for complete search history.

(56) References Cited

U.S. PATENT DOCUMENTS 11,107,364 B2 8/2021 Lor et al.
2004/0012674 A1* 1/2004 Wada ................. G08B 13/1963
348/169

FOREIGN PATENT DOCUMENTS

CN 209479971 U * 10/2019
TW 201944365 A 11/2019

* cited by examiner

*Primary Examiner* — Clayton E. LaBalle
*Assistant Examiner* — Fang-Chi Chang

(57) ABSTRACT

A compact first-person-view (FPV) pan and tilt camera mount is installed in a remote-controlled vehicle, and the vehicle is configured to accommodate a video processing module/air unit, a camera module, and a horizontal and vertical rotatable (pan and tilt) camera mount module. A realistic scale remote-controlled scale vehicle typically comes with interior cabin or cockpit space to accommodate driver/pilot that can be utilized to install the pan & tilt camera module. The video processing module is configured to process images shot by the camera module. The camera is mounted on the pan and tilt module. The pan and tilt module includes a first servo, a base, a movable seat, a rotation module, a clamp portion, and an accommodation portion. The first servo has a first shaft, the movable seat has a fitting seat, and the fitting seat has a connection orifice. The rotation module has a first semi-circular gear and a second semi-circular gear meshing. The accommodation portion is formed on the movable seat and is configured to receive a second servo, and the second servo has a second shaft.

2 Claims, 10 Drawing Sheets

COMPACT FIRST PERSON VIEW (FPV) PAN AND TILT CAMERA MOUNT

FIELD OF THE INVENTION

The present invention is applicable for use on remote-controlled airplanes, helicopters, cars, boats, drones to control camera devices, and more particularly a compact first-person view (FPV) camera. The pan and tilt mount enables the rotation of FPV cameras.

BACKGROUND OF THE INVENTION

A conventional first-person-view (FPV) gimbal is applied to control a radio-controlled vehicle (such as a remote-controlled airplane, helicopter, car, boat, or drone) from the view of the driver or a pilot. It grants the operator the ability to remotely drive or control an RC vehicle from the first-person view through the onboard camera, which wirelessly sends video signals to the receiving FPV goggles or video screen.

A conventional FPV camera pan & tilt module has a complicated structure and large size, so the camera module cannot be easily installed in a limited space. Furthermore, the conventional FPV pan & tilt camera module needs a large space to rotate freely, thus limiting the size and type of remote-controlled vehicle that it can be installed in. If the camera module is installed in the limited space of a vehicle, the travel of conventional pan and tilt mount is greatly limited. This may induce unnecessary stress on the electronic components, potentially damaging them. Additionally, many conventional pan and tilt mounts experience a significant amount of rotational drift, detrimental to the experience of the operator.

The conventional FPV camera pan & tilt module contains electronic servo drive structure configured to rotate horizontally and vertically, and the drive structure often contains a series of linkages and levers. Loose tolerances between the servos and linkages induce vibrations of the visual image captured by the camera module. This video could cause inexact judgment, directional error, and motion sickness to the user.

A method of enhancing the first-person-view experience for the conventional FPV camera module is disclosed in TW Publication No. 201944365, wherein multiple cameras are mounted on a vehicle, and the vehicle has an image stabilization module, a processing module, information separator of a simulator chair, motion processing unit of the sport chair, a control unit of the sport chair, a G force calculation unit of the sport chair, and a force feedback generating unit of the sport chair. The motion processing unit is configured to produce image stabilizing signals from the cameras and to calculate degree of freedom of six-axis movements. As shown in FIGS. 1 to 3 of TW Publication No. 201944365, the conventional camera module of FPV has following defects:

1. The images are shot at different angles of the cameras, thus causing high cost of the FPV.
2. Because the images are shot at different angles of the cameras, there will be a short switching time, and the screen is not continuous, which will cause the user experience to be poor, when the user wants to see the images in other directions.

The present invention has arisen to mitigate and/or obviate the aforementioned disadvantages.

SUMMARY OF THE INVENTION

The primary aspect of the present invention is to provide a compact first-person view (FPV) pan and tilt camera mount which contains multiple servos and actuation mechanisms connected vertically to rotate horizontally and vertically, such that the camera module is able to rotate freely, smoothly, and stably to obtain a realistic piloting/driving effect.

Another aspect of the present invention is to provide a compact yet stable first-person view (FPV) pan and tilt camera mount which contains the multiple servo actuation mechanisms connected vertically to reduce the overall footprint in the limited space of a vehicle. The tight clearance between gears and other parts in the present invention, in conjunction with shock-absorbing foam pads, help enhance the visual experience for the operator.

To obtain the above-mentioned aspects, a compact first-person view (FPV) pan and tilt camera mount provided by the present invention is fixed in a vehicle that has enough clearance for the camera to move in all directions.

The vehicle would need to include an adequate chamber in which the FPV camera, video transmitter module, and camera mount are able to be accommodated.

The FPV camera is mounted on the pan and tilt camera mount to shoot and transmit the images to the FPV display via the video transmitter module.

The pan servo is fitted on the base, and the base is installed in the vehicle by ways of multiple screws. The pan servo has a shaft oriented vertically, on which the movable upper portion of the mount is attached. This setup enables the FPV camera to rotate horizontally.

The movable upper portion features the second servo, which is oriented on its side in order to allow for vertical rotation. It is slotted into the upper portion of the mount and secured using two screws. The second servo actuates the bottom semi-circular gear that interfaces with the top semi-circular gear. The top semi-circular gear is firmly screwed to the FPV camera, enabling the camera to rotate vertically as the servo rotates the bottom semi-circular gear.

To provide the operator with an uninterrupted and unhindered experience, the pan and tilt mount has built-in molded wire management clips, to aid with wire organization.

The present invention is formed in a compact column shape, with an approximate footprint of 5 centimeters in length, 3.5 centimeters in width, and 6 centimeters in height (including the protruding bottom horizontal rotation servo).

In addition to the pan and tilt mount itself, also included with the present invention is a plastic clip holder for the video transmitter.

The pan and tilt mount is installed using screws on the operator's vehicle of choice.

DETAILED DESCRIPTION OF THE PREFERRED EMBODIMENTS

Figure 1:
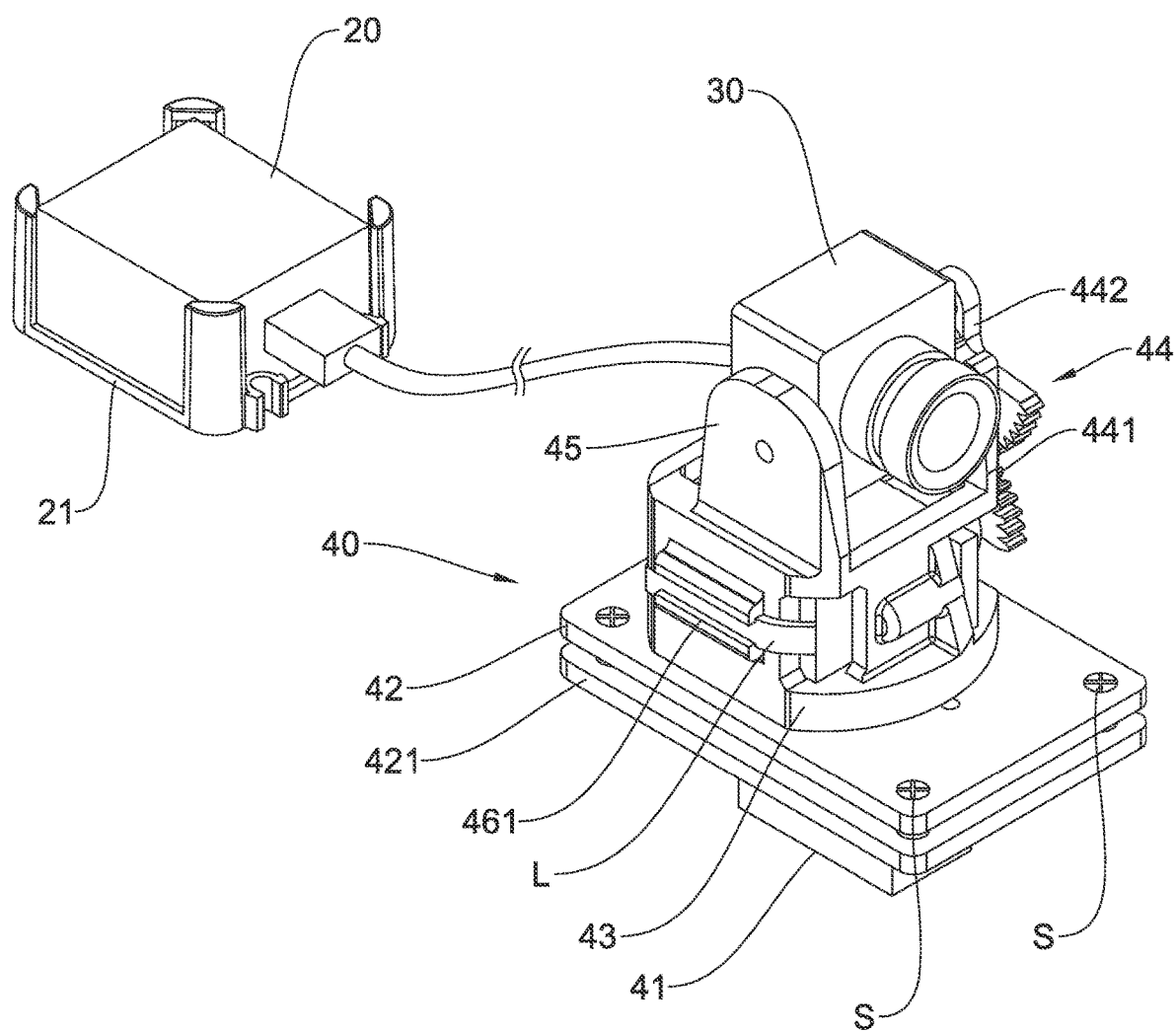
FIG. 1 is a perspective view showing the assembly of a compact first person view (FPV) pan and tilt camera mount according to a preferred embodiment of the present invention.
Figure 9:
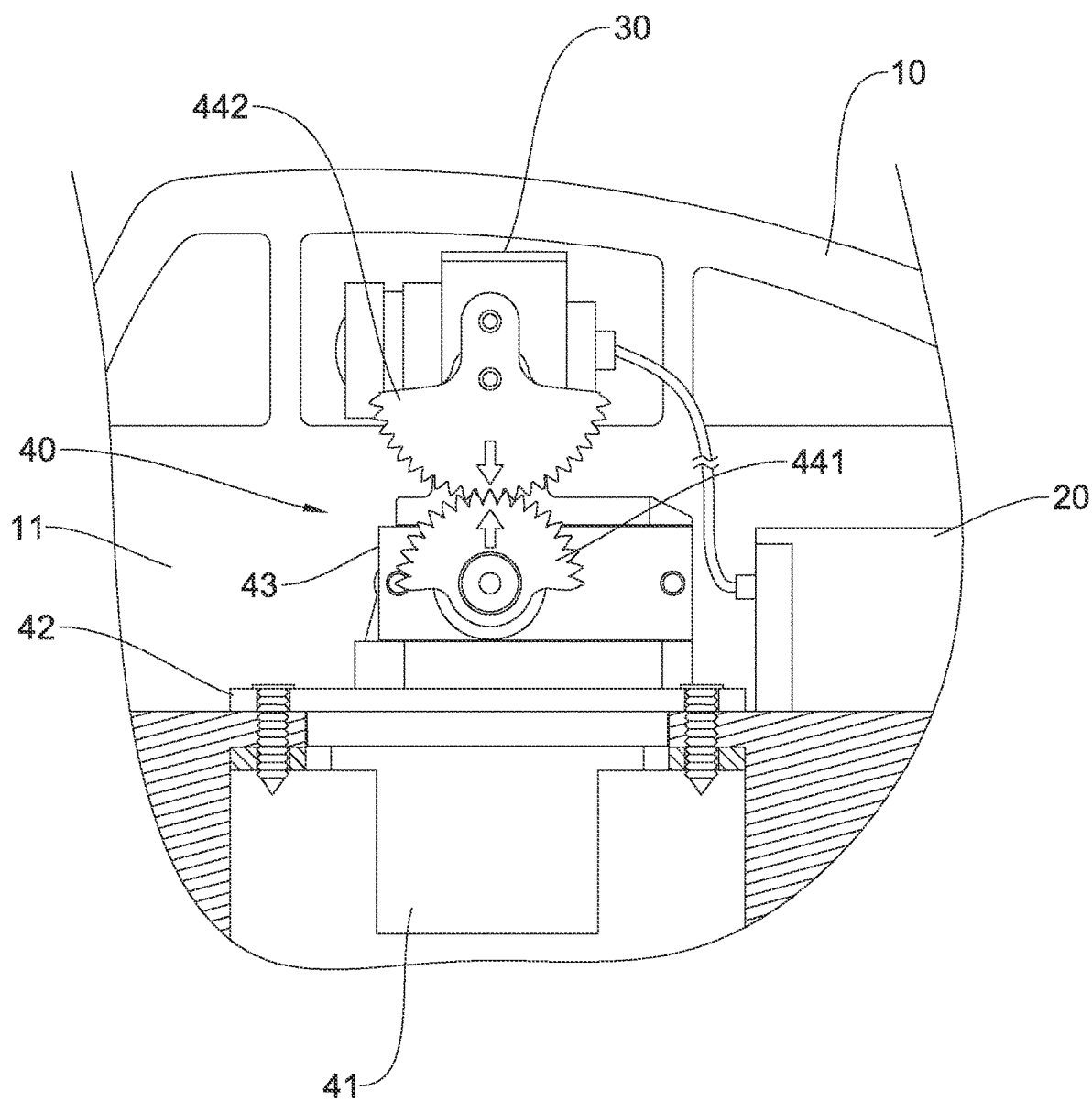
FIG. 9 is a cross-sectional view showing the assembly of a part of the compact first person view (FPV) pan and tilt camera mount according to the preferred embodiment of the present invention.
Figure 10:
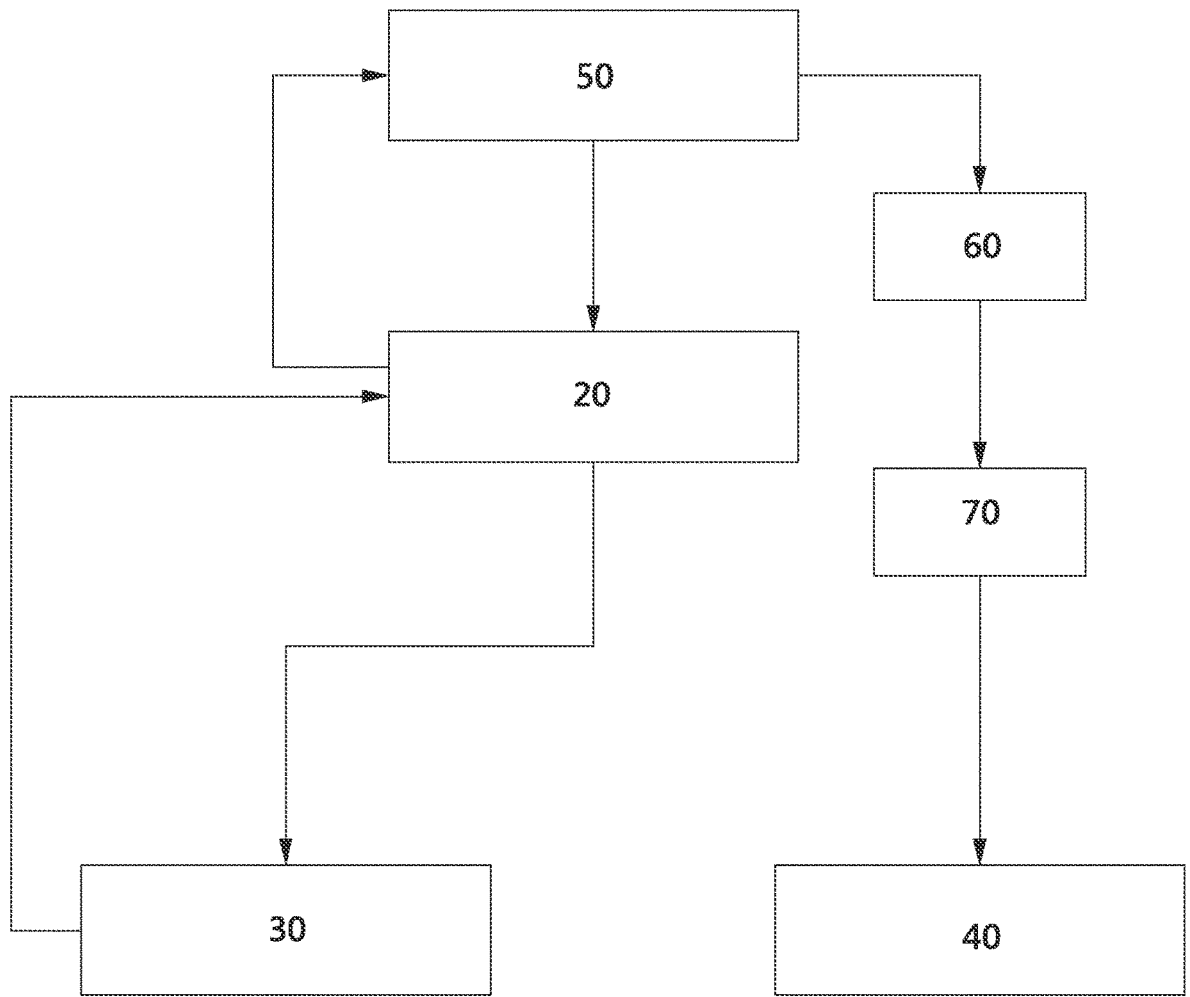
FIG. 10 is a schematic view showing the operation of the compact first person view (FPV) pan and tilt camera mount according to the preferred embodiment of the present invention.

With reference to FIGS. 1 and 9, a compact first-person view (FPV) pan and tilt camera mount according to a preferred embodiment of the present invention is fixed in a vehicle 10, and the vehicle 10 is configured to accommodate a processing module 20, a camera module 30, and a direction-rotatable driving module 40.

Referring to FIG. 9, the vehicle 10 includes a receiving chamber 11 in which the processing module 20, the camera module 30, and the direction-rotatable driving module 40 are accommodated, wherein the vehicle 10 is operated by a user to move or/and rotate, and the compact first person view (FPV) pan and tilt camera mount is compact to be received in a cockpit of a remote control plane and is rotated within 280°.

As shown in FIGS. 1 and 9, the processing module 20 is accommodated in the receiving chamber 11 and is configured to process images shot by the camera module 30, wherein when receiving actions of an augmented reality device (not shown), the proceeding module 20 does not contact with a rear end of the camera module 30 directly because a camera cable is connected on a rear end of the FPV camera, hence a holder 21 is mounted in the receiving chamber 11, and the camera cable is connected on the rear end of the FPV (but the conventional camera cable is connected and is pulled downward on a center of the FPV) so that the compact first person view (FPV) pan and tilt camera mount is rotated with the users head movement to obtain a realistic driving effect.

As illustrated in FIG. 1, the camera module 30 is mounted on and is driven by the direction changeable driving module 40 to shoot and send the images toward the augmented reality device via the processing module 20.

Figure 2:
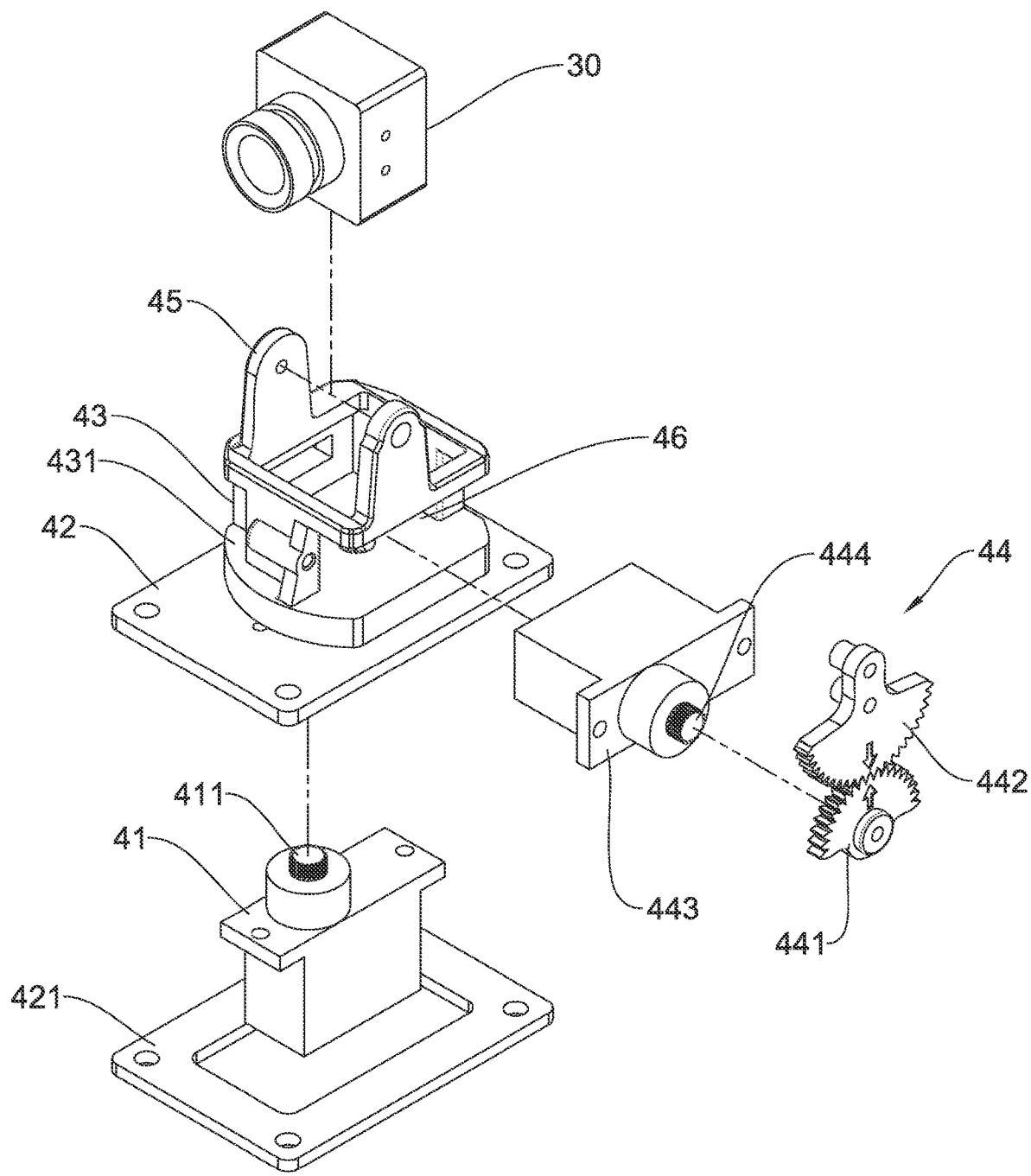
FIG. 2 is a perspective view showing the exploded components of the compact first person view (FPV) pan and tilt camera according to the preferred embodiment of the present invention.

With reference to FIG. 9, the direction-rotatable driving module 40 is accommodated in the receiving chamber 11. Referring to FIG. 2, the direction-rotatable module 40 includes a first servo 41, a base 42, a movable seat 43, a rotation module 44, a clamp portion 45, and an accommodation portion 46.

As shown in FIGS. 1 and 2, the first servo 41 is fitted on the base 42, and the base 42 is secured in the receiving chamber 11 by ways of multiple screws. As illustrated in FIGS. 1 and 9, the base 42 is connected with an engagement plate 421 in the receiving chamber 11.

Figure 3:
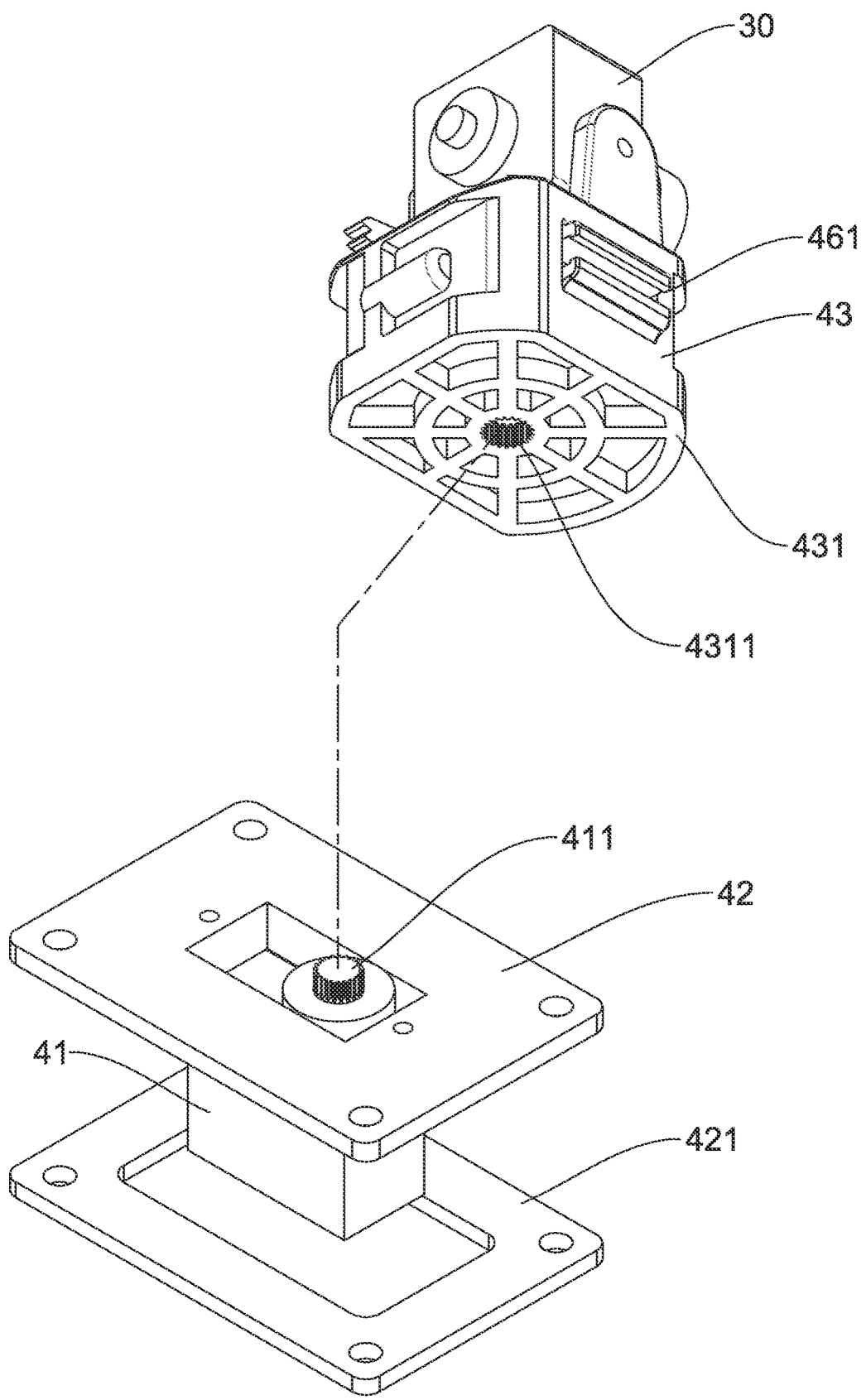
FIG. 3 is a perspective view showing the exploded components of a first servo and a movable seat of the compact first person view (FPV) pan and tilt camera according to the preferred embodiment of the present invention.
Figure 4:
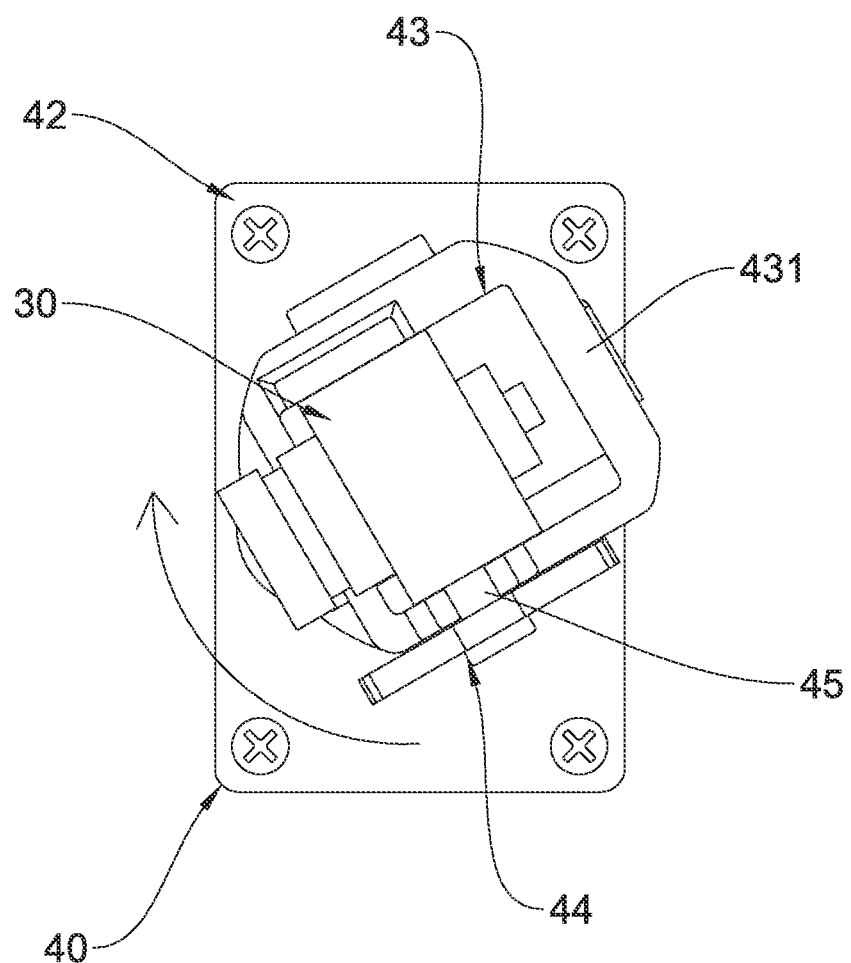
FIG. 4 is a top plan view showing the operation of the first motor of the compact first person view (FPV) pan and tilt camera according to the preferred embodiment of the present invention.
Figure 5:
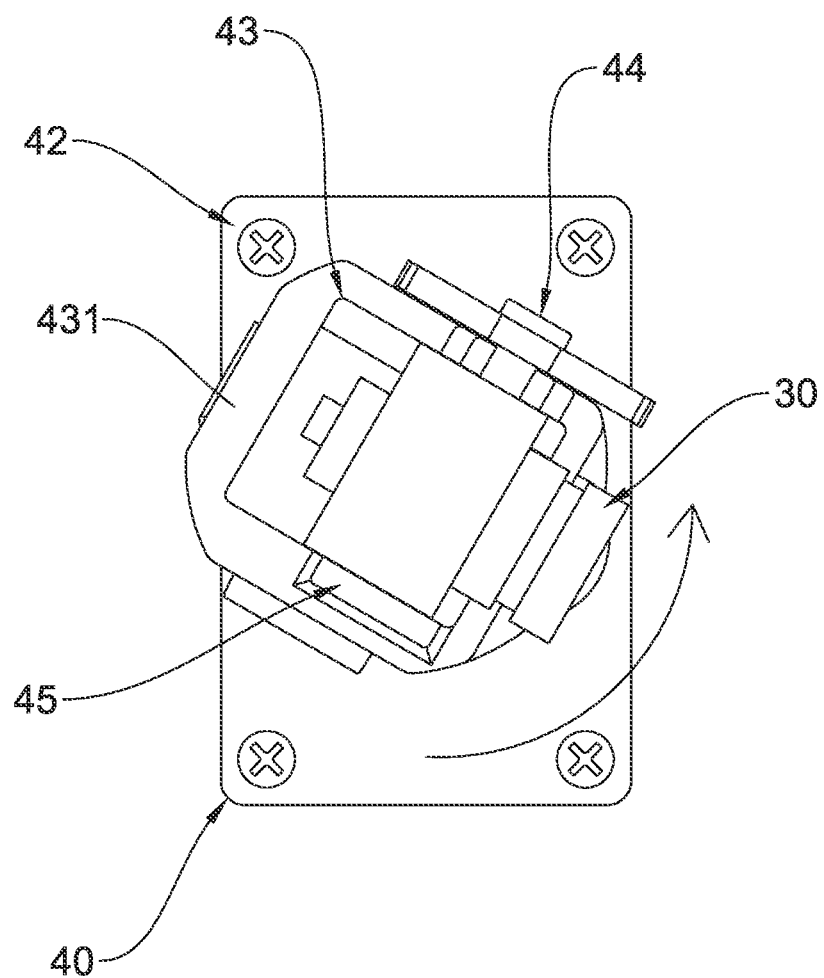
FIG. 5 is another top plan view showing the operation of the first motor of the compact first person view (FPV) pan and tilt camera according to the preferred embodiment of the present invention.

With reference to FIG. 3, the first motor 41 has a first shaft 411, the movable seat 43 is arranged on the base 42, and the movable seat 43 has a fitting seat 431 and the clamp portion 45 fixed on the fitting seat 431, wherein the fitting seat 431 has a connection orifice 4311 defined on a center thereof and is fitted on the first shaft 411, as shown in FIGS. 4 and 5, and the movable seat 43 is actuated by the first motor 41 to move horizontally.

Figure 6:
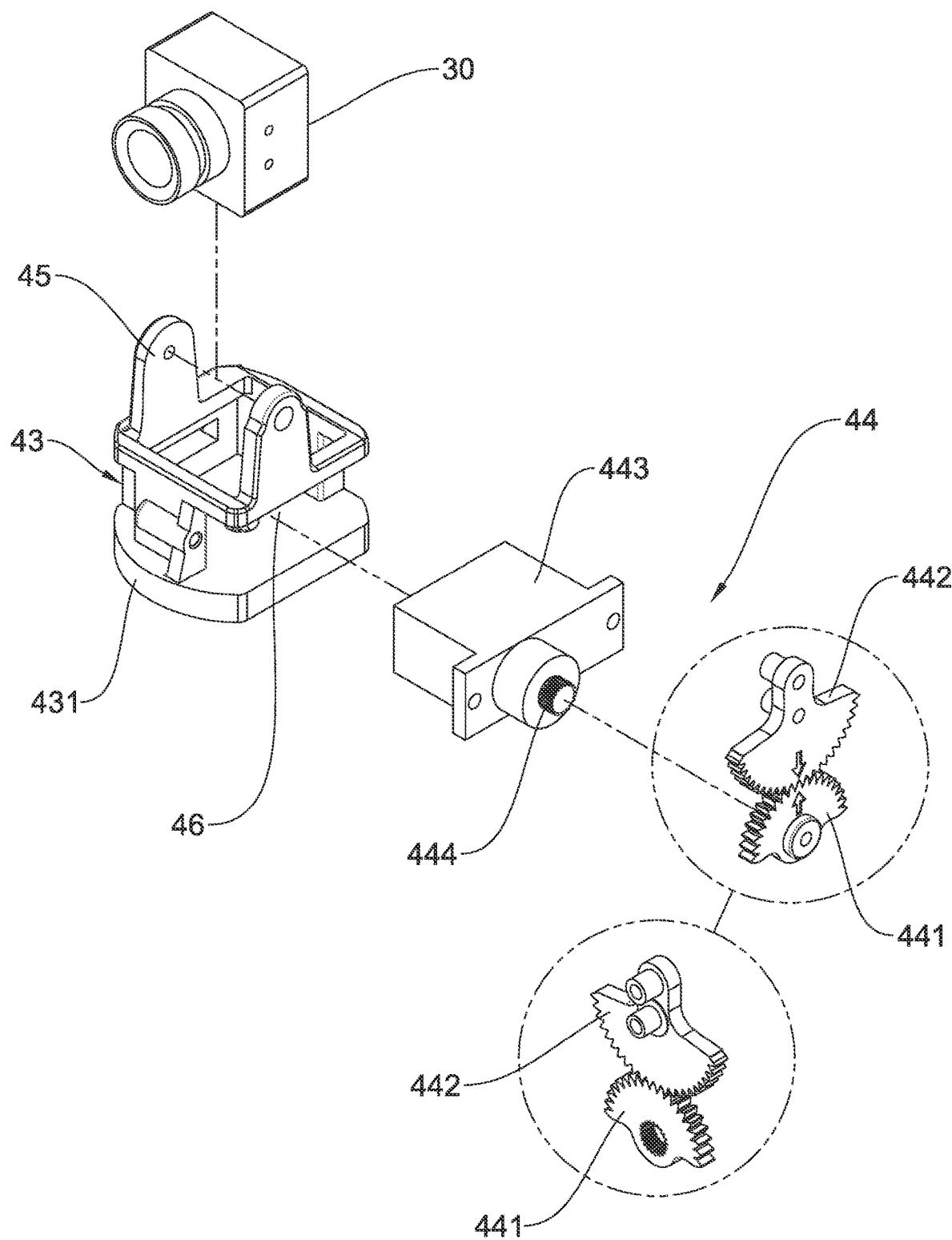
FIG. 6 is a perspective view showing the exploded components of a direction-rotatable driving module and of a clamp portion of the movable seat of the compact first person view (FPV) pan and tilt camera according to the preferred embodiment of the present invention.
Figure 7:
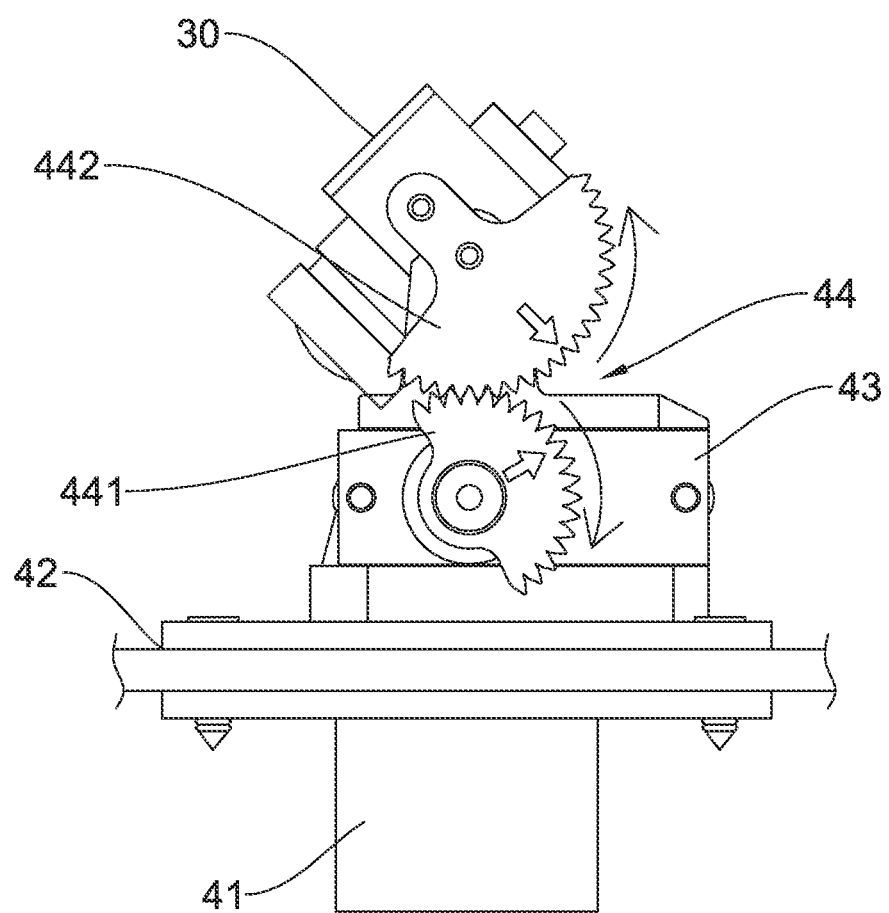
FIG. 7 is a side plan view showing the operation of the direction-rotatable driving module and a camera module of the compact first person view (FPV) pan and tilt camera according to the preferred embodiment of the present invention.
Figure 8:
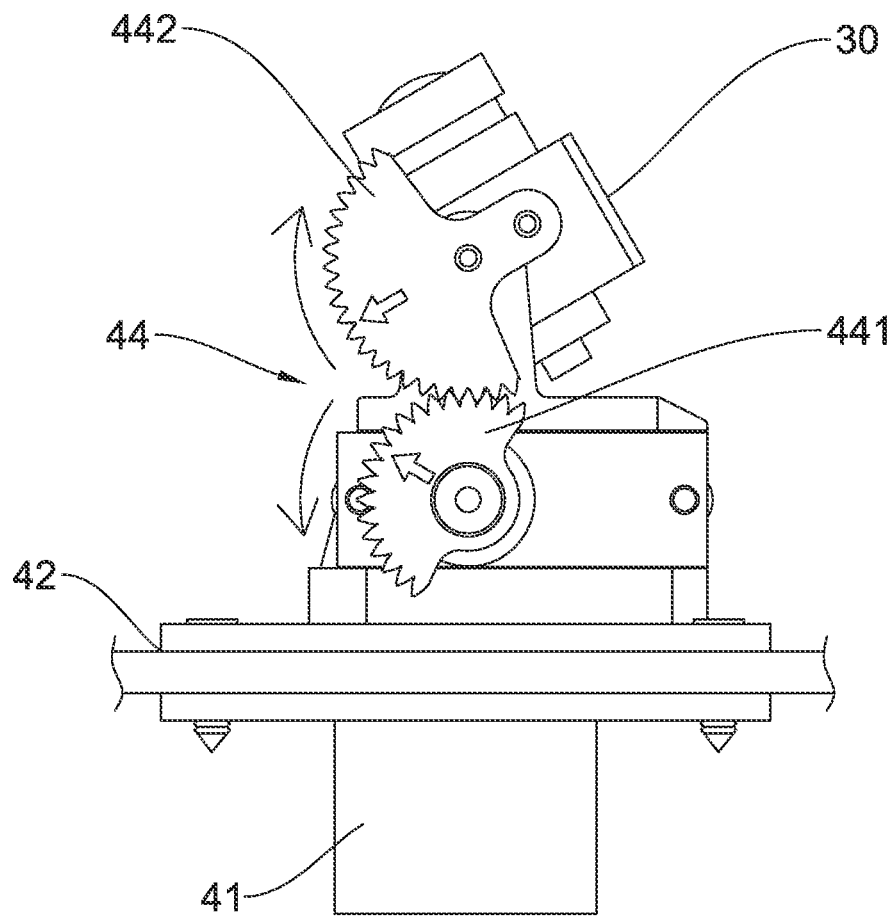
FIG. 8 is another side plan view showing the operation of the direction-rotatable driving module and the camera module of the compact first-person view (FPV) pan and tilt camera according to the preferred embodiment of the present invention.

Referring to FIGS. 1, 2 and 6, the clamp portion 45 is configured to clamp the camera module 30, the rotation module 44 is disposed on an outer wall of the clamp portion 45, and the rotation module 44 has a first semi-circular gear 441 and a second semi-circular gear 442 meshing with the first semi-circular gear 441. The accommodation portion 46 is formed on the movable seat 43 and is configured to receive a second servo 443, and the second servo 443 has a second shaft 444 extending therefrom and rotatably connected with the first semi-circular gear 441, as shown in FIGS. 7 and 8, such that the second motor 443 drives the first semi-circular gear to rotate via the second shaft 444, the second semi-circular gear 442 is actuated by the first semi-circular gear 441, and the camera module 30 of the clamp portion 45 is driven by the rotation module 44 to revolve vertically.

With reference to FIGS. 2 and 3, the accommodation portion 46 has a slot 461 defined on an outer wall thereof, the first servo 41 is connected with the second servo 443 via multiple wires L, and the multiple wires L are received in the slot 461 so as to avoid an interfere to the first servor 41 and the second servo 443.

The direction-rotatable driving module 40 is formed in a column shape, a diameter of the direction-rotatable driving module 40 in the receiving chamber 11 is 4 cm, and a height of the direction-rotatable driving module 40 is 5 cm, thus receiving the direction-rotatable driving module 40 in a small space, such as a compact unmanned aerial vehicle. Preferably, a wide vision is realized when receiving the direction-rotatable driving module 40 in a large-size unmanned aerial vehicle.

Referring to FIGS. 1-10, in application, the augmented reality device 50 is electrically connected with the processing unit 20 by using a remote control device 60 and a receiver 70 of the vehicle 10, such that the camera module 30 is actuated by the direction-rotatable driving module 40 to shoot the images upward, downward, leftward, and rightward, thus obtaining real flight feeling to the user.

While the preferred embodiments of the invention have been set forth for purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A compact first person view (FPV) pan and tilt camera mount being fixed in a vehicle, and the vehicle being configured to accommodate a processing module, a camera module, and a direction-rotatable driving module;

wherein the vehicle includes a receiving chamber in which the processing module, the camera module, and the direction-rotatable driving module are accommodated, wherein the vehicle is operated by a user to move or/and rotate;

wherein the processing module is accommodated in the receiving chamber and is configured to process images shot by the camera module;

wherein the camera module is mounted on and is driven by the direction-rotatable driving module to shoot and send the images toward an augmented reality device via the processing module;

wherein the direction-rotatable driving module is accommodated in the receiving chamber, and the direction-rotatable driving module includes a first servo, a base, a movable seat, a rotation module, a clamp portion, and an accommodation portion;

wherein the direction-rotatable driving module is formed in a column shape, a diameter of the direction-rotatable driving module in the receiving chamber is 4 cm, and a height of the direction-rotatable driving module is 5 cm;

wherein the first servo is fitted on the base, and the base is secured in the receiving chamber by ways of multiple screws, the first servo has a first shaft, the movable seat is arranged on the base, and the movable seat has a fitting seat and the clamp portion fixed on the fitting seat, wherein the fitting seat has a connection orifice defined on a center thereof and is fitted on the first shaft, and the movable seat is actuated by the first servo to move horizontally;

wherein the clamp portion is configured to clamp the camera module, the rotation module is disposed on an outer wall of the clamp portion, and the rotation module has a first semi-circular gear and a second semi-circular gear meshing with the first semi-circular gear; and wherein the accommodation portion is formed on the movable seat and is configured to receive a second servo, and the second servo has a second shaft extending therefrom and rotatably connected with the first semi-circular gear, such that the second servo drives the first semi-circular gear to rotate via the second shaft, the second semi-circular gear is actuated by the first semi-circular gear, and the camera module of the clamp portion is driven by the rotation module to revolve vertically.

2. A compact first person view (FPV) pan and tilt camera mount being fixed in a vehicle, and the vehicle being configured to accommodate a processing module, a camera module, and a direction-rotatable driving module;

wherein the vehicle includes a receiving chamber in which the processing module, the camera module, and the direction-rotatable driving module are accommodated, wherein the vehicle is operated by a user to move or/and rotate;

wherein the processing module is accommodated in the receiving chamber and is configured to process images shot by the camera module;

wherein the camera module is mounted on and is driven by the direction-rotatable driving module to shoot and send the images toward an augmented reality device via the processing module;

wherein the direction-rotatable driving module is accommodated in the receiving chamber, and the direction-rotatable driving module includes a first servo, a base, a movable seat, a rotation module, a clamp portion, and an accommodation portion;

wherein the first servo is fitted on the base, and the base is secured in the receiving chamber by ways of multiple screws, the first servo has a first shaft, the movable seat is arranged on the base, and the movable seat has a fitting seat and the clamp portion fixed on the fitting seat, wherein the fitting seat has a connection orifice defined on a center thereof and is fitted on the first shaft, and the movable seat is actuated by the first servo to move horizontally;

wherein the clamp portion is configured to clamp the camera module, the rotation module is disposed on an outer wall of the clamp portion, and the rotation module has a first semi-circular gear and a second semi-circular gear meshing with the first semi-circular gear; and wherein the accommodation portion is formed on the movable seat and is configured to receive a second servo, and the second servo has a second shaft extending therefrom and rotatably connected with the first semi-circular gear, such that the second servo drives the first semi-circular gear to rotate via the second shaft, the second semi-circular gear is actuated by the first semi-circular gear, and the camera module of the clamp portion is driven by the rotation module to revolve vertically;

wherein the accommodation portion has a slot defined on an outer wall thereof, the first servo is connected with the second servo via multiple wires, and the multiple wires are received in the slot so as to avoid an interfere to the first servo and the second servo.

* * * * *